April 2, 1935. W. VON PIOTROWSKI ET AL 1,996,692
PROCESS OF PREPARING VALUABLE COMPOUNDS FROM THE WASTE PRODUCTS
OBTAINED IN THE REFINING OF CRACKED MINERAL OILS
Filed March 23, 1933
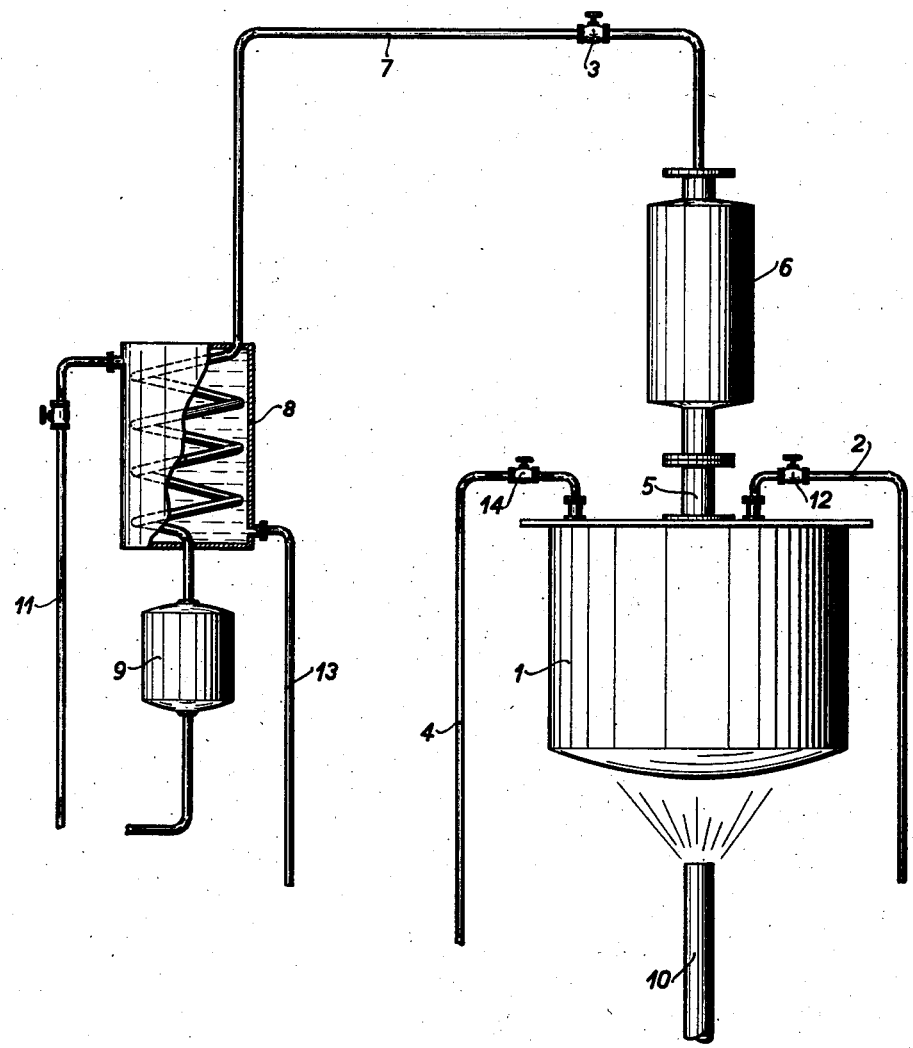
W. von Piotrowski +
J. Winkler
INVENTORS Patented Apr. 2, 1935

1,996,692

UNITED STATES PATENT OFFICE 1,996,692

PROCESS OF PREPARING VALUABLE COMPOUNDS FROM THE WASTE PRODUCTS OBTAINED IN THE REFINING OF CRACKED MINERAL OILS

Waclaw von Piotrowski and Józef Winkler, Drohobycz, Poland

Application March 23, 1933, Serial No. 662,397

2 Claims. (Cl. 196—148)

In U. S. Patent No. 1,869,231 we have described a process for obtaining valuable compounds from the waste products in the refining processes of cracked mineral oils, particularly cracked benzines with sulfuric acid. These products are a mixture of olefines, diolefines, ketones, higher alcohols, sulfides, disulfides, mercaptanes, thiophenes and the like. Some fractions may be used as insecticides or fungicides, furthermore as odorizing substances for odorless gas and denaturizing means for alcohol.

The above mentioned process comprises diluting the acid sludge with water or dilute caustic alkali solutions, allowing the mixture to separate into two layers, removing the oily layer after being neutralized and distilling it after drying. The distillate coming over between 50 and 280° C. is collected separately and may afterwards be rectified or fractionally distilled according to the desired end products.

The residue of distillation is a product which has about the following properties:

| | |
|---|---|
| Specific gravity at 15° C | 0.960 |
| Viscosity at 50° C | 6° Engler |
| At —18° C | Liquid |
| S-contents | 9% |
| O-contents | 4% |

This product was up to the present used as a fuel, since another possibility of application was not known; or it was worked up to an asphalt-like product by blowing it with air.

We have now discovered, and this is the object of the present invention, that the above mentioned distillation residue may be distilled without steam under cracking conditions, whereby it gives some more distillates coming over between 50 and 280° C. and having the same chemical nature as the products obtained by distilling the oily layer of the waste acid sludge as described in our Patent 1,869,231.

By heating the said residue without steam, especially when pressure is applied, a depolymerization occurs, yielding a mixture of products rich in oxygen and in sulfur. By this method it is possible to increase the output of the process described in U. S. Patent 1,869,231, so that the yield is almost a threefold one.

In the accompanying drawing one embodiment of the invention is illustrated.

The apparatus used for carrying out the process according to the invention comprises a still 1 heated by any suitable means, for instance a burner 10. The still is provided with three tubes, viz., an admission tube 2 and a tube 4 for introducing the oil to be treated, both tubes having cut-off valves 12 and 14, respectively. Another pipe 5 leads to a dephlegmator 6, said dephlegmator being connected by a tube 7 with a cooler 8 and a receiver 9. In the pipe 7 a pressure regulating valve 3 is provided. The cooler 8 is provided with water inlet and outlet tubes 11 and 13.

The process is carried out as follows:

The oil is introduced by the pipe 4 into the still 1 and distilled with steam until all the compounds coming over between 50° C. and 280° C. have been driven off and collected.

Thereafter the steam admission valve 12 is closed, the heating reduced and the pressure regulating valve 3 arranged in the pipe 3 near the dephlegmator 6 is slowly closed until the pressure in the still will amount to 6 atmospheres.

The heating is slowly increased, whereupon a light distillate begins to escape through the dephlegmator 6 and pipe 7 and cooler 8 to the receiver 9. The distillation is continued until the specific gravity of the distillate finally coming over amounts to 0.850.

What we claim is:—

1. In a process of preparing valuable compounds from the waste products obtained in the refining of cracked mineral oils with acid which process comprises mixing the waste acid-containing sludge with water and a dilute alkaline solution, allowing the mixture to separate into two layers, removing the upper oily layer, subjecting the same to steam distillation, thereby producing a plurality of fractions collecting the fractions coming over between 50° C. and 280° C., the step of subjecting the residue of said steam distillation to a distillation by heating in the absence of steam under cracking conditions thereby producing further quantities of distillates, coming over between 50° C. and 280° C.

2. A process according to claim 1, characterized thereby, that the distillates obtained by distilling the residue are joined with those obtained in the steam distillation of the oily layer of the waste acid sludge.

WACLAW VON PIOTROWSKI.
JÓZEF WINKLER.